US012131579B2

(12) United States Patent
Chae et al.

(10) Patent No.: US 12,131,579 B2
(45) Date of Patent: Oct. 29, 2024

(54) INFORMATION PROCESSING DEVICE, INFORMATION PROCESSING METHOD AND PROGRAM

(71) Applicant: RAKUTEN GROUP, INC., Tokyo (JP)

(72) Inventors: Yeongnam Chae, Tokyo (JP); Bjorn Stenger, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 350 days.

(21) Appl. No.: 17/761,596

(22) PCT Filed: Mar. 22, 2021

(86) PCT No.: PCT/JP2021/011727
§ 371 (c)(1),
(2) Date: Mar. 18, 2022

(87) PCT Pub. No.: WO2022/201247
PCT Pub. Date: Sep. 29, 2022

(65) Prior Publication Data
US 2024/0029471 A1    Jan. 25, 2024

(51) Int. Cl.
*G06V 40/16*    (2022.01)
*G06V 10/56*    (2022.01)

(52) U.S. Cl.
CPC ............ *G06V 40/162* (2022.01); *G06V 10/56* (2022.01); *G06V 40/168* (2022.01)

(58) Field of Classification Search
CPC .... G06V 40/162; G06V 10/56; G06V 40/168; G06T 7/90
See application file for complete search history.

(56) References Cited

U.S. PATENT DOCUMENTS

| 8,693,740 B1* | 4/2014 | Sridhara | G06V 40/162 |
| | | | 382/118 |
| 2009/0316168 A1* | 12/2009 | Enjuji | G06V 40/162 |
| | | | 358/1.9 |
| 2010/0172578 A1* | 7/2010 | Reid | G06V 40/162 |
| | | | 382/165 |

FOREIGN PATENT DOCUMENTS

| JP | 2004206665 A | 7/2004 |
| JP | 2020-102059 A | 7/2020 |

OTHER PUBLICATIONS

Pratheepan Yogarajah et al. "A dynamic threshold approach for skin segmentation in color images", 2010 17th IEEE International Conference on Image Processing (ICIP 2010); Sep. 26-29, 2010 Hong Kong, China, IEEE, Piscataway, NJ, USA, Sep. 26, 2010, pp. 2225-2228, XP031814206, ISBN: 978-1-4244-7992-4.

(Continued)

*Primary Examiner* — John R Wallace
(74) *Attorney, Agent, or Firm* — HEA Law PLLC

(57) ABSTRACT

An information processing device extracts, from an image taken by an imaging device, a human area in which it is determined that a human is present, acquires a representative value of first feature values, the first feature values being calculated by inputting, to a conversion function, each color of pixels included in a part of the human area, corrects, based on the representative value, a skin range indicating that a color indicated by a feature value acquired with the conversion function is a color of human skin, and determines whether a human is present in a part of the image acquired by the imaging device, based on whether a second feature value calculated with the conversion function for each of a plurality of pixels forming the part of the image is within the corrected skin range.

9 Claims, 8 Drawing Sheets

(56) References Cited

OTHER PUBLICATIONS

Search Report of Jul. 21, 2022, for corresponding EP Patent Application No. 21867864.7 pp. 1-10.
Saxen Frerk et.al. "Color-based skin segmentation: An evaluation of the state of the art", 2014 IEEE International Conference on Image Processing (ICIP), IEEE, Oct. 27, 2014, pp. 4467-4471, XP032967427, DOI: 10.1109/ICIP.2014.7025906.
Office Action of Dec. 22, 2023, for corresponding EP Patent Application No. 21867864.7.
Office Action for corresponding Japanese Patent Application No. 2022-093498 dated on May 9, 2023, with partial English translation, pp. 1-5.
Office Action of Sep. 12, 2023, for corresponding JP Patent Application No. 2022-093498 with its partial translation, pp. 1-4.
A New Colour Space for Skin Tone Detection, Abbas Cheddad, Joan Condell, Kevin Curran and Paul Mc Kevitt, 2009 IEEE International Conference on Image Processing, pp. 497-500.

\* cited by examiner

INFORMATION PROCESSING DEVICE, INFORMATION PROCESSING METHOD AND PROGRAM

CROSS REFERENCE TO RELATED APPLICATIONS

This application is a National Stage of International Application No. PCT/JP2021/011727 filed on Mar. 22, 2021. The contents of the above document is incorporated herein by reference in its entirety.

TECHNICAL FIELD

The present invention relates to an information processing device, an information processing method, and a program.

BACKGROUND ART

There is a technology of determining whether a human is present from an image taken by an imaging device. One of methods of determining human presence bases the determination on whether colors of pixels in a partial area of the image are within a range determined in advance.

In Non-Patent Literature 1, there is disclosed a method in which a value is obtained by inputting a color of a pixel to a predetermined function, and the pixel is determined to be skin when the value is within a predetermined range.

CITATION LIST

Non Patent Literature

[NPL 1] A NEW COLOUR SPACE FOR SKIN TONE DETECTION, Abbas Cheddad, Joan Condell, Kevin Curran and Paul Mc Kevitt, 2009 IEEE International Conference on Image Processing

SUMMARY OF INVENTION

Technical Problem

A skin color in a taken image may fall outside of a color range determined in advance, due to influence of lighting or the like. There have been cases of failure to appropriately determine human presence in such circumstances.

The present invention has been made in view of the problem described above, and an object of the present invention is therefore to provide a technology with which whether a human is present is determined more precisely based on colors in an image.

Solution to Problem

In order to solve the above-mentioned object, according to one embodiment of the present invention, there is provided an information processing device including: extraction means for extracting a human area in which it is determined that a human is present from an image taken by an imaging device; representative acquisition means for acquiring a representative value of first feature values, the first feature values being calculated by inputting, to a conversion function, each color of pixels included in a part of the human area; correction means for correcting, based on the representative value, a skin range indicating that a color indicated by a feature value acquired with the conversion function is a color of human skin; and determination means for determining whether a human is present in a part of the image acquired by the imaging device, based on whether a second feature value calculated with the conversion function for each of a plurality of pixels forming the part of the image is within the corrected skin range.

Further, according to one embodiment of the present invention, there is provided an information processing method including: extracting a human area in which it is determined that a human is present, from an image taken by an imaging device; acquiring a representative value of first feature values, the first feature values being calculated by inputting, to a conversion function, each color of pixels included in a part of the human area; correcting, based on the representative value, a skin range indicating that a color indicated by a feature value acquired with the conversion function is a color of human skin; and determining whether a human is present in a part of the image acquired by the imaging device, based on whether a second feature value calculated with the conversion function for each of a plurality of pixels forming the part of the image is within the corrected skin range.

Further, according to one embodiment of the present invention, there is provided a program for causing a computer to function as: extraction means for extracting a human area in which it is determined that a human is present, from an image taken by an imaging device; representative acquisition means for acquiring a representative value of first feature values, the first feature values being calculated by inputting, to a conversion function, each color of pixels included in a part of the human area; correction means for correcting, based on the representative value, a skin range indicating that a color indicated by a feature value acquired with the conversion function is a color of human skin; and determination means for determining whether a human is present in a part of the image acquired by the imaging device, based on whether a second feature value calculated with the conversion function for each of a plurality of pixels forming the part of the image is within the corrected skin range.

According to one aspect of the present invention, the human area may be a face area, and the part of the human area may be an area of the human area that includes vicinity of eyes and that excludes vicinity of a mouth and an upper part of a forehead.

According to one aspect of the present invention, the correction means may be configured to correct the skin range so that an amount of correction becomes less as a quantity of pixels each having the first feature value that is outside the skin range becomes smaller.

According to one aspect of the present invention, the representative value may be an average value of the feature values.

According to one aspect of the present invention, when a red component, a green component, and a blue component of a pixel are given as R, G, and B, respectively, and $C_r$, $C_g$, and $C_b$ are coefficients determined in advance, an output "e" of the conversion function may be calculated by the following expression: $e = C_r \times R + C_g \times G + C_b \times B - \max(G, B)$.

According to one aspect of the present invention, when an average value of the feature values used to calculate the skin range before the correction is given as $\mu r$, an average value of the first feature values is given as $\mu 1$, a quantity of pixels each having the first feature value that is outside the skin range is given as An, a quantity of pixels forming the part of the human area is given as Ap, and "n" is an integer of 1 or more and 3 or less, an upper limit value and a lower limit value of the skin range may be corrected based on $\Delta\mu$ calculated with the following expression: $\Delta\mu=(\mu 1-\mu r)\times(An/Ap)^n$.

According to one aspect of the present invention, when an average value of the feature values used to calculate the skin range before the correction is given as $\mu r$, an average value of the first feature values is given as $\mu 1$, a quantity of pixels each having the first feature value that is outside the skin range is given as An, a quantity of pixels forming the part of the human area is given as Ap, a quantity of pixels of an eye area included in the part is given as Ae, and "n" is an integer of 1 or more and 3 or less, an upper limit value and a lower limit value of the skin range may be corrected based on $\Delta\mu$ calculated with the following expression: $\Delta\mu=(\mu 1-\mu r)\times(An/(Ap-Ae))^n$.

According to one aspect of the present invention, the extraction means may be configured to extract a plurality of face areas as a plurality of human areas, the representative acquisition means may be configured to acquire a representative value of first feature values of pixels included in a part of a largest face area out of the plurality of face areas, the first feature values being calculated with the conversion function by inputting, to the conversion function, each color of the pixels included in the part of the largest face area, and the determination means may be configured to determine whether one of the plurality of face areas that is not used to acquire the representative value includes a human face, based on whether a second feature value calculated with the conversion function for each of pixels included in the one of the plurality of face areas is within the corrected skin range.

Advantageous Effects of Invention

According to the present invention, whether the human is present can be determined from the image with higher precision.

DESCRIPTION OF EMBODIMENT

Now, an embodiment of the present invention is described with reference to the drawings. Redundant description of configurations denoted by the same reference symbols is omitted. This embodiment gives description of an information processing system for detecting, based on a taken image, whether a person other than a worker is peeking in remote work or similar environments in which tight control of access to a room is not practiced.

Figure 1:
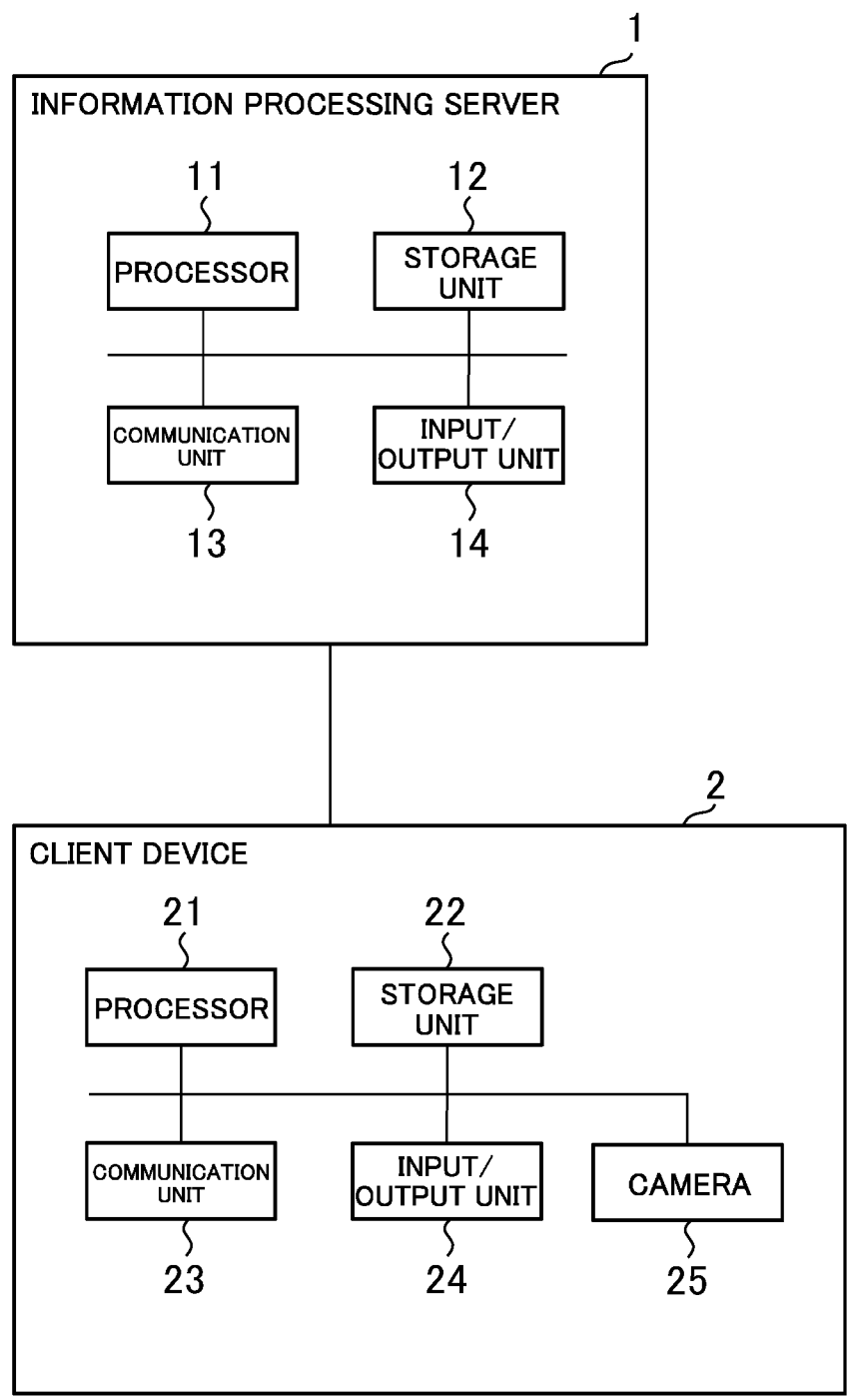
FIG. 1 is a diagram for illustrating an example of an information processing system in an embodiment of the present invention.

FIG. 1 is a diagram for illustrating an example of the information processing system in the embodiment of the present invention. The information processing system includes an information processing server 1 and a client device 2. The information processing server 1 is connected to one or a plurality of client devices 2 via a network.

The information processing server 1 includes a processor 11, a storage unit 12, a communication unit 13, and an input/output unit 14. The information processing server 1 is a server computer. Processing of the information processing server 1 may be implemented by a plurality of server computers. The client device 2 includes a processor 21, a storage unit 22, a communication unit 23, an input/output unit 24, and a camera 25. The client device 2 is a personal computer or a tablet terminal.

The processors 11 and 21 operate in accordance with programs stored in the storage units 12 and 22, respectively. The processors 11 and 21 also control the communication units 13 and 23 and the input/output units 14 and 24, respectively. The processor 21 further controls the camera 25 in accordance with the program. The above-mentioned programs may be provided through, for example, the Internet, or may be provided by being stored in a flash memory, a DVD-ROM, or another computer-readable storage medium.

The storage units 12 and 22 are each formed of a memory device such as a RAM or a flash memory, and an external storage device such as a hard disk drive. The storage units 12 and 22 store the above-mentioned programs. The storage units 12 and 22 also store information and calculation results that are input from the processors 11 and 21, the communication units 13 and 23, and the input/output units 14 and 24, respectively.

The communication units 13 and 23 each implement a function of communicating with another device, and are each formed of, for example, an integrated circuit for implementing a wireless LAN or a wired LAN. Under control of the processors 11 and 21, the communication units 13 and 23 input information received from another device to the processors 11 and 21 and the storage units 12 and 22, respectively, and transmit information to another device.

The input/output units 14 and 24 are each formed of, for example, a video controller for controlling a display output device and a controller for acquiring data from an input device. Examples of the input device include a keyboard, a mouse, and a touch panel. The input/output units 14 and 24 output display data to the display output device under the control of the processors 11 and 21, respectively, and acquire data input by the user operating the input device. The display output device is, for example, a display device connected to the outside.

The camera 25 takes an image under control of the processor 21. The camera 25 is, for example, built into a personal computer or a tablet terminal and is positioned so that a person operating the personal computer or the tablet terminal is photographed approximately at the center.

Figure 2:
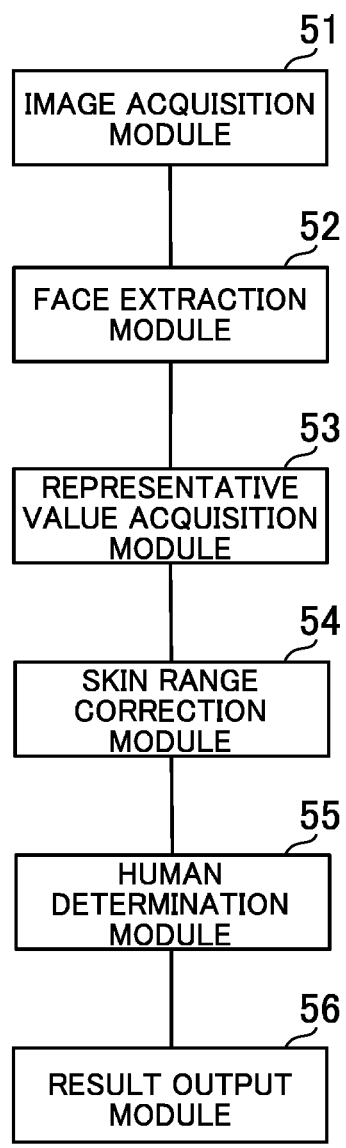
FIG. 2 is a block diagram for illustrating functions to be implemented by the information processing system.

Next, functions provided by the information processing system are described. FIG. 2 is a block diagram for illustrating functions implemented by the information processing system. The information processing system includes, in terms of function, an image acquisition module 51, a face extraction module 52, a representative value acquisition module 53, a skin range correction module 54, a human determination module 55, and a result output module 56. Those functions are implemented by the processor 21 included in the client device 2 by controlling the communication unit 23, the camera 25, and others through execution of programs stored in the storage unit 22. Those functions may be implemented by the processor 11 included in the information processing server 1 by controlling the communication unit 13 and others through execution of programs stored in the storage unit 12.

The image acquisition module 51 acquires an image taken by the camera 25, which is an imaging device. When the image acquisition module 51 is implemented by the information processing server 1, a taken image transmitted from the communication unit 23 of the client device 2 may be acquired by receiving the taken image via the communication unit 13.

The face extraction module 52 extracts, from the acquired image, a face area 70 determined to be an area in which a face is located. The face extraction module 52 converts the acquired image into a gray scale image and extracts, as the face area 70, an area in which a face recognized by a known face detection technology which is based on pattern recognition is located. The extracted face area 70 may be a rectangular area. The face extraction module 52 may detect, instead of the face area 70, a human area including a part of a person other than a face, for example, a hand, or a silhouette of a person based on known technology which is based on pattern recognition, and the human area may be used in processing described below in place of the face area 70.

Figure 3:
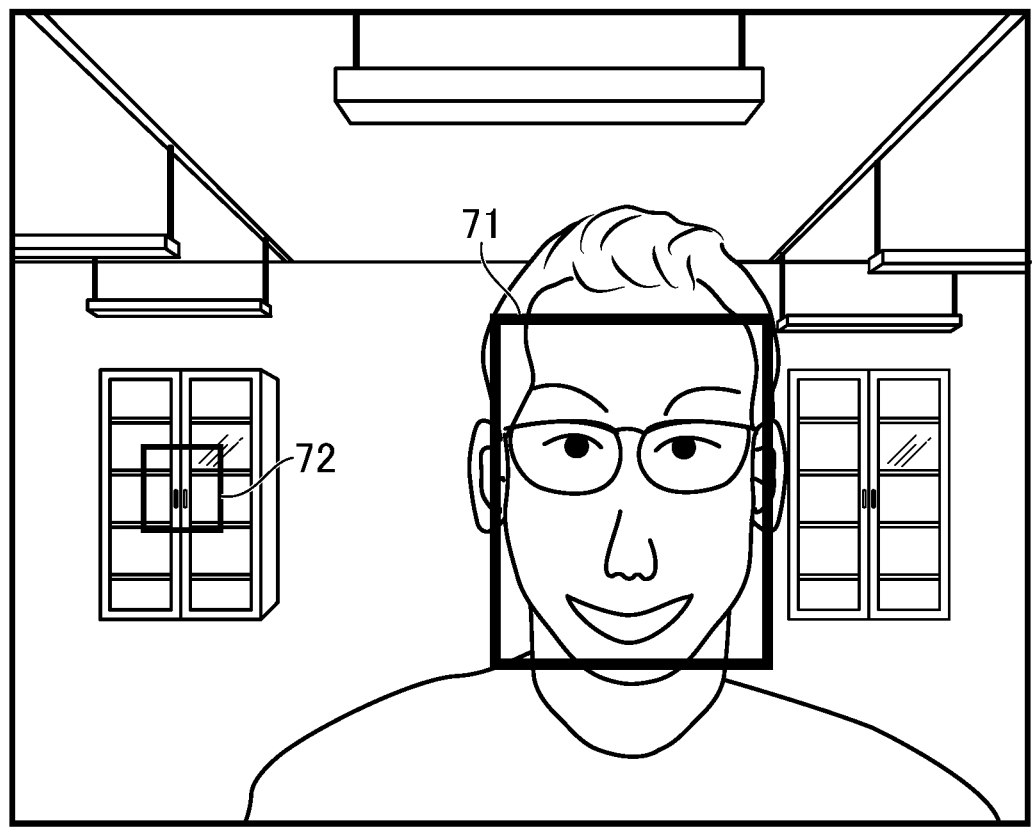
FIG. 3 is a diagram for illustrating an example of a face area recognized from an image.

FIG. 3 is a diagram for illustrating an example of the face area 70 recognized from an image. In FIG. 3, face areas 71 and 72 are extracted from the image as an example of the face area 70. The face area 71 is an extracted image of the face of a person operating the client device 2. The face area 72, on the other hand, is extracted as a result of false recognition in which a pattern on a piece of furniture or the like in the background is recognized as a face.

The representative value acquisition module 53 inputs each color of pixels included in a part of the face area to a conversion function to calculate a feature value of the pixel. The representative value acquisition module 53 acquires a representative value of calculated feature values such as an average value of the feature values. The face area 70 to be processed by the representative value acquisition module 53 is the face area 70 that is largest, or the face area 70 that is located at the center, out of every face area 70 extracted by the face extraction module 52. Details of the conversion function and the feature value are described later.

The skin range correction module 54 corrects, based on the acquired representative value, a skin range indicating that a color indicated by the feature value acquired with the conversion function is a color of human skin. Details of the skin range are described later.

The human determination module 55 determines, based on whether the feature value calculated with the conversion function for each of a plurality of pixels that form a part of an image taken by the camera 25 is within the corrected skin range, whether a human is present in that part of that image. The part of the image that is used in processing of the human determination module 55 may be the face area 70 that has not been used by the representative value acquisition module 53 to acquire the representative value, out of every face area 70 extracted by the face extraction module 52. The processing by the human determination module 55 may be executed when a plurality of face areas 70 are extracted by the face extraction module 52.

The result output module 56 outputs a result of the determination of the human determination module 55. More specifically, when it is determined through the processing of the human determination module 55 that a human is present in a part of an image taken by the camera 25, even more specifically, when it is determined that a human is present in one face area 70 or any one of the plurality of face areas 70 that has not been used in the acquisition of the representative value, the result output module 56 outputs a warning message alerting of the presence of a person peeking. A destination to which the warning message is output may be a display or a speaker of the client device 2.

Figure 4:
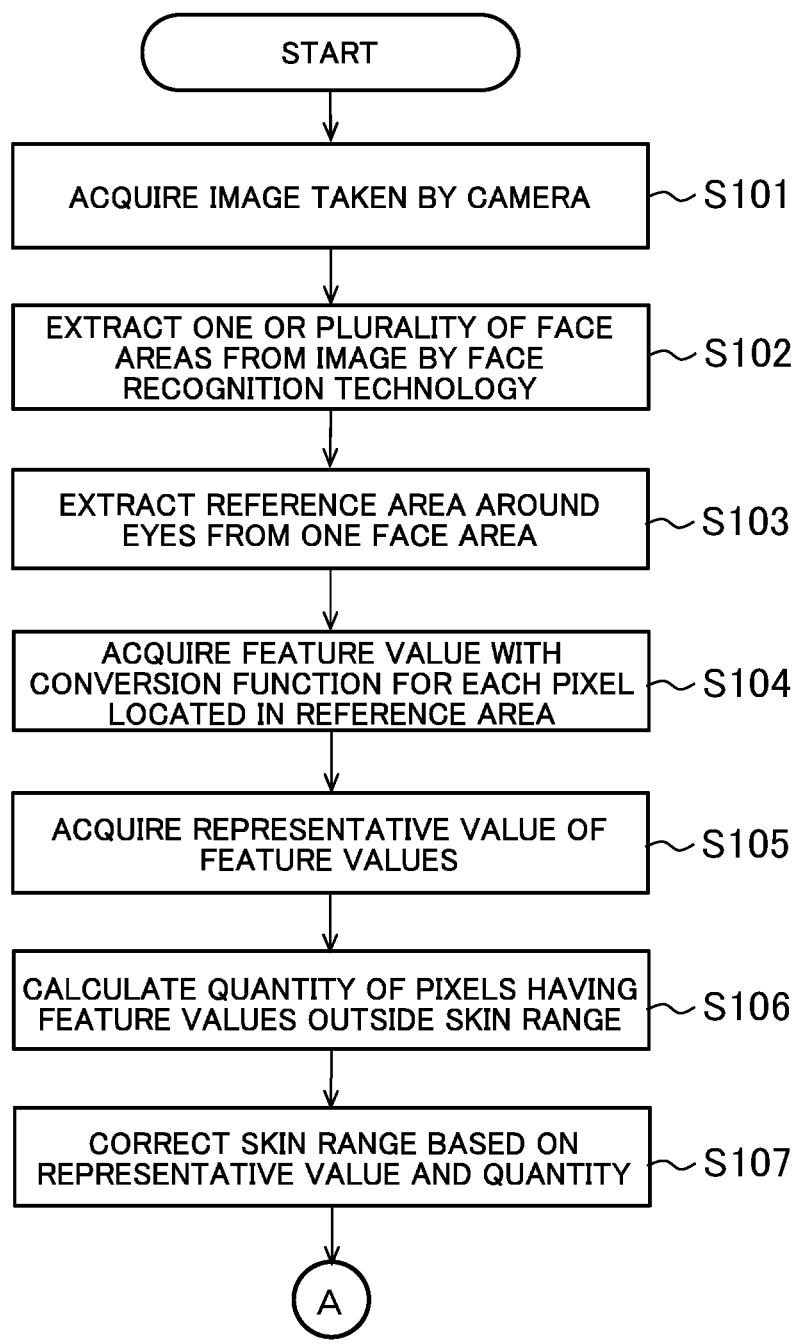
FIG. 4 is a flow chart for illustrating an example of processing executed by a client device.
Figure 5:
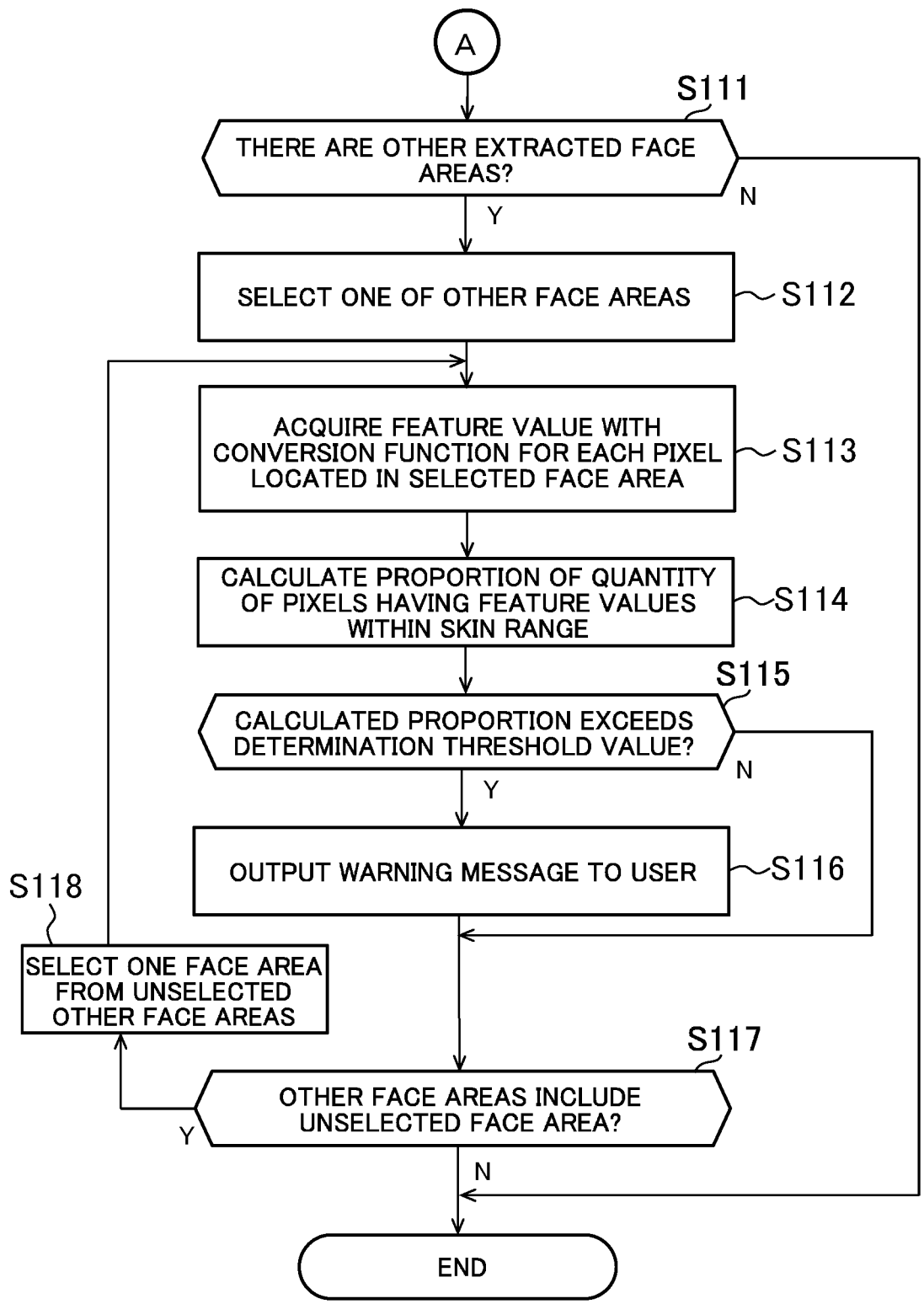
FIG. 5 is a flow chart for illustrating an example of the processing executed by the client device.

Details of the processing of the information processing system are described next. FIG. 4 and FIG. 5 are flow charts for illustrating an example of the processing executed by the client device 2. The processing illustrated in FIG. 4 and FIG. 5 may repeatedly be executed at fixed time intervals.

First, the image acquisition module 51 acquires an image taken by the camera 25 (Step S101). Next, the face extraction module 52 uses a known face recognition technology to acquire at least one of face areas 70 from the acquired image (Step S102).

When the at least one of face areas 70 are acquired, the representative value acquisition module 53 selects one face area out of the at least one of face areas 70, and acquires a reference area 75 located around eyes from the selected face area 70 (Step S103). The representative value acquisition module 53 may acquire, as the reference area 75, an area located at a relative position high in the likelihood of being a location of surroundings of the eyes in the selected face area 70. The representative value acquisition module 53 may also acquire, as the reference area 75, an area identified to be the surroundings of the eyes by image recognition. The following includes description of the reference area 75 and a further description of the former method.

Figure 6:
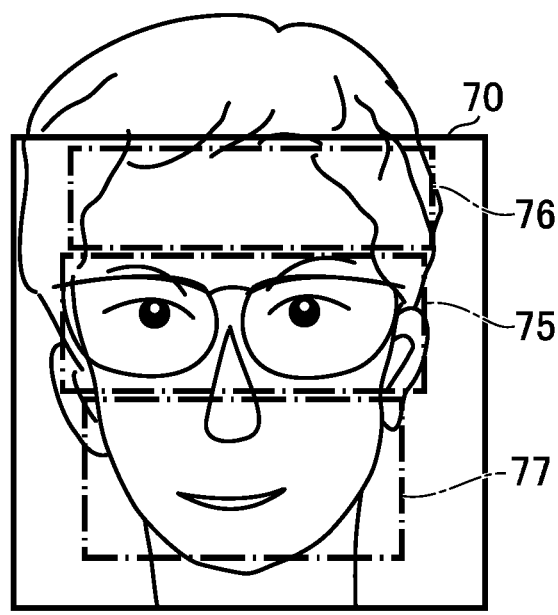
FIG. 6 is a diagram for illustrating a reference area included in the face area.

FIG. 6 is a diagram for illustrating the reference area 75 included in the face area 70. The face area 70 includes the reference area 75, an upper area 76, and a lower area 77. The reference area 75 is an area including the vicinity of the eyes. The upper area 76 is an area above the reference area 75 which includes an upper part of a forehead. The lower area 77 is an area below the reference area 75 which includes a mouth. The upper part of the forehead of the upper area 76 is likely to be hidden by hair, and surroundings of the mouth of the lower area 77 is likely to be hidden by a mask. The reference area 75 around the eyes is accordingly an area in which a human skin color is most visibly recognizable.

The representative value acquisition module 53 determines the reference area 75 based on the relative position inside the face area 70. An example in which the face area 70 is a rectangular area having sides that run in longitudinal and lateral directions of the taken image, and the rectangular face area 70 has upper left coordinates (tx, ty), a lateral size th, and a longitudinal size tv is discussed. In this case, the representative value acquisition module 53 may acquire a rectangular area in which upper left coordinates are (tx+0.05×th, ty+0.1tv) and lower right coordinates are (tx+0.9×th, ty+0.45tv) as the reference area 75. The reference area 75 may be another area in which the likelihood of the skin being exposed is high.

The representative value acquisition module 53 uses a conversion function "e" to acquire the feature value for each pixel located in the reference area 75 (Step S104). More specifically, the representative value acquisition module 53 inputs, for each pixel located in the reference area 75, a color of the pixel to the conversion function "e" and acquires an output from the conversion function "e" as the feature value. The conversion function "e" is the following expression.

$$e = Cr \times R + Cg \times G + Cb \times B - \max(G, B)$$

In the expression, R, G, and B represent a red component, a green component, and a blue component of the color of the pixel, respectively, and max(G, B) is a function for outputting a larger one of G and B. Cr, Cg, and Cb are coefficients determined in advance. Cr, Cg, and Cb are calculated by observation under lighting that serves as reference, and take, for examples, values given below. Those values may be adjusted based on the environment or the like.

$$Cr=0.2989$$

$$Cg=0.5870$$

$$Cb=0.1402$$

Once the feature value is calculated for each pixel located in the reference area 75, the representative value acquisition module 53 acquires an average value as a representative value of the feature values (Step S105). The representative value acquisition module 53 may calculate the representative value by other methods such as a method in which a mode value is calculated.

The skin range correction module 54 calculates a quantity of pixels having the feature values that are outside a skin range R (Step S106).

Figure 7:
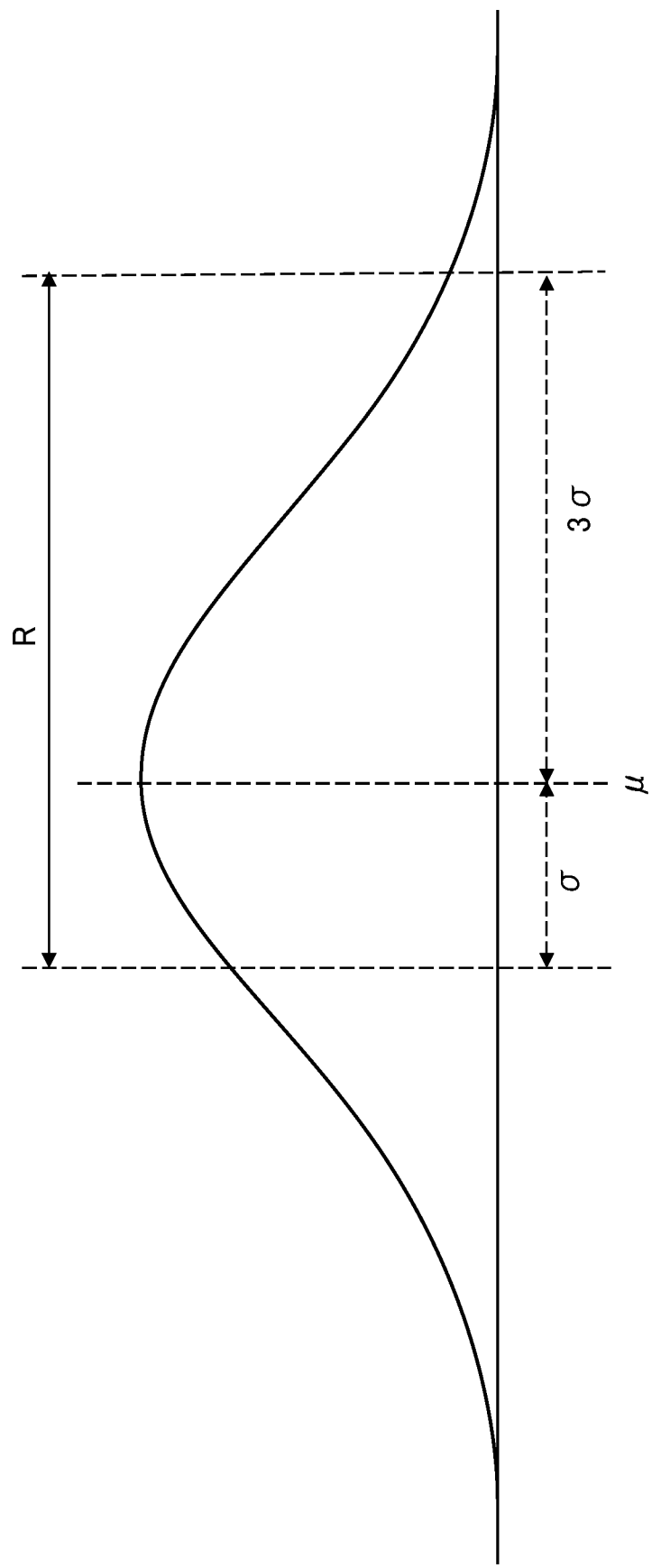
FIG. 7 is a graph for showing a distribution of skin colors.

FIG. 7 is a graph for showing a distribution of skin colors. In FIG. 7, a normal distribution of feature values for colors of the human skin is shown. On the normal distribution, individual differences which are based on environmental differences and genetic differences are reflected. When an average value of the normal distribution is "$\mu$" and variance thereof is "$\sigma$", a lower limit value and an upper limit value of the skin range R are ($\mu-\sigma$) and ($\mu+3\sigma$), respectively. Values of "$\mu$" and "$\sigma$" are empirically obtained. For example, "$\mu$" is 12.3057 and "$\sigma$" is 5.09026.

A specific description of the processing is given. The skin range correction module 54 determines, for each pixel, whether the feature value of the pixel is within the skin range R, and counts the number (quantity) of pixels having the feature values outside the skin range R.

The skin range correction module 54 then corrects the skin range R based on the calculated representative value and the calculated quantity of pixels that fall within the skin range R (Step S107).

The skin range R is corrected by calculating each of a lower value and an upper value thereof based on $\Delta\mu$. To give a specific example, a lower limit value of the corrected skin range R is ($\mu+\Delta\mu-\sigma$) and an upper limit value of the corrected skin range R is ($\mu+\Delta\mu+3\sigma$). The value of $\Delta\mu$ is obtained by the following expression.

$$\Delta\mu=(\mu 1-\mu r)\times(An/Ap)^n$$

Figure 8:
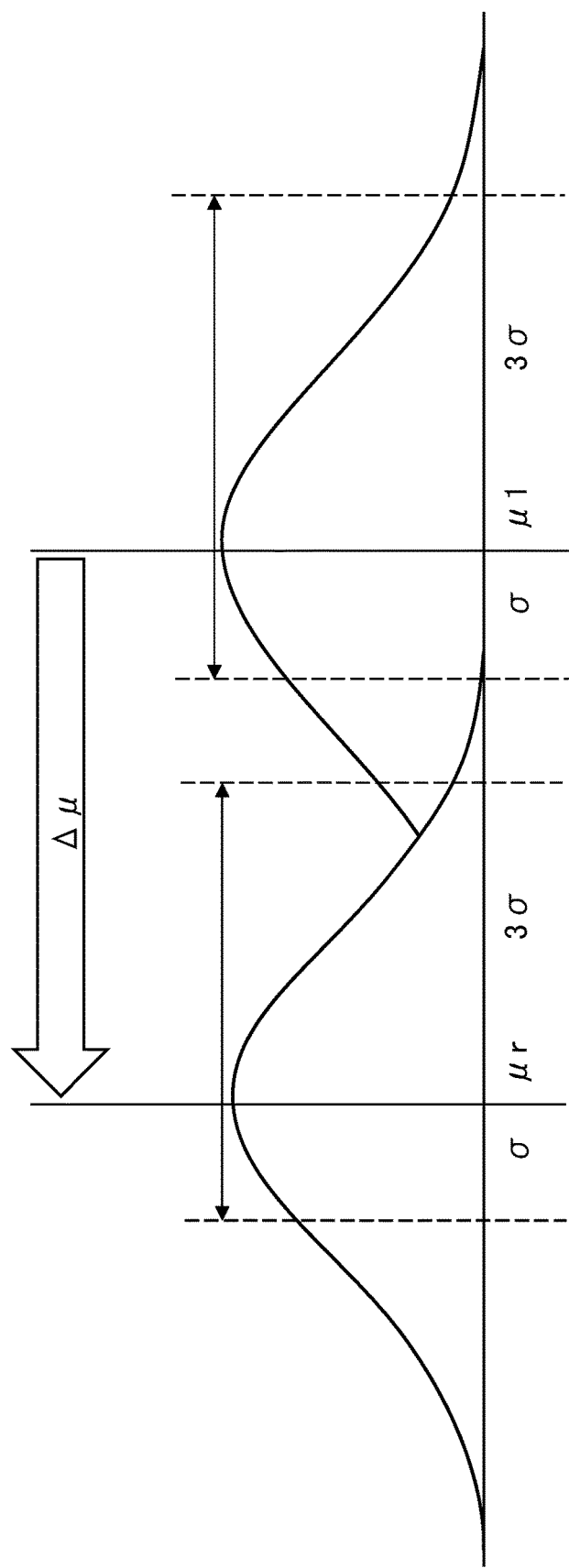
FIG. 8 is a graph for schematically showing influence of lighting.

FIG. 8 is a graph for schematically showing influence of lighting, and is a graph for showing a change in the distribution of the feature values, in other words, occurrence of $\Delta\mu$, due to differences in lighting. In the above expression, $\mu 1$ represents the value of "$\mu$" obtained from the distribution before correction. Further, $\mu r$ represents the representative value (here, an average value) of the feature values calculated for pixels located in the reference area 75.

Further, in the above expression, An represents the quantity of pixels having the feature values outside the skin range R, out of the pixels located in the reference area 75, and Ap represents the quantity of all pixels included in the reference area 75. Still further, An corresponds to an area of a part of the reference area 75 in which the feature values are outside the skin range R, and Ap corresponds to an area of the reference area 75. Yet further, "n" represents an integer of 1 or more, and preferably 3, although 1 is acceptable as the value of "n".

A possibility of overcorrection due to factors other than lighting being reflected on correction, or for other reasons, can be reduced by causing correction to become weaker as the quantity of pixels having the feature values outside the skin range R becomes smaller. The possibility of excessive correction of the skin range R when a large number of pixels fall within the skin range R can be decreased by increasing "n".

The value of $\Delta\mu$ may be obtained by the following expression.

$$\Delta\mu=(\mu 1-\mu r)\times(An/(Ap-Ae))^n$$

In this expression, Ae represents the quantity of pixels in a part of the reference area 75 in which the eyes are located, and may simply be a predetermined proportion (for example, 5%) of the quantity of all pixels of the reference area 75. In this case, Ap−Ae may be obtained by simply multiplying the quantity of pixels of the reference area 75 by a constant smaller than 1 (for example, 0.95).

Once the skin range R is corrected, the human determination module 55 determines, from the image taken by the camera 25, whether a human face is included in the face area 70 other than the face area 70 for which the representative value has been obtained to correct the skin range R. To describe this processing more specifically, the human determination module 55 determines whether there is the face area 70 extracted by the face extraction module 52 other than the face area 70 for which the representative value has been obtained (Step S111). When there is no other face area 70 (Step S111: N), it is determined that there is no person other than the operator of the client device 2, and the process is ended.

When there is at least one other face area 70 (Step S111: Y), on the other hand, the human determination module 55 selects one face area out of the at least one other face area 70 (Step S112). The human determination module 55 then uses the conversion function to acquire the feature value for each pixel located in the selected face area 70 (Step S113). The human determination module 55 calculates a proportion of the quantity of pixels for which the feature values is in the corrected skin range R to the quantity of all pixels of the reference area 75 (Step S114).

When the calculated proportion exceeds a determination threshold value determined in advance (Step S115: Y), the result output module 56 outputs a warning message alerting of a possibility of being peeked to the user operating the client device 2 (Step S116), and also transmits information of that to the information processing server 1. The result output module 56 forcedly shuts down the client device 2 when the number of times at which, or the length of time for which, the calculated proportion has been determined to exceed the determination threshold value exceeds a predetermined threshold value. When the calculated proportion does not exceed the determination threshold value (Step S115: N), on the other hand, the processing step of Step S116 is skipped.

The human determination module 55 then determines whether the at least one other face area 70 includes any face area 70 that has not been selected (Step S117). When the at least one other face area 70 includes at least one face area 70 that has not been selected (Step S117: Y), one face area 70 is selected from the at least one other face area 70 that has not been selected (Step S118), and Step S113 and subsequent processing steps are repeated. When there is no face area 70 left to select (Step S117: N), the process is ended.

The processing illustrated in FIG. 4 and FIG. 5 may be executed by the information processing server 1 instead of the client device 2. In this case, the image acquisition module 51 acquires an image transmitted from the client device 2 in Step S101. In Step S116, information for causing the client device 2 to output the warning message is transmitted to the client device 2.

As described above, the skin range R is corrected with the use of an area in which skin colors are easy to recognize, and the corrected skin range is used to determine the presence of a skin in an image. Lowering of determination precision from a change in photographed skin color due to lighting can thus be decreased.

REFERENCE SIGNS LIST 1 information processing server, 2 client device, 11, 21 processor, 12, 22 storage unit, 13, 23 communication unit, 14, 24 input/output unit, 25 camera, 51 image acquisition module, 52 face extraction module, 53 representative value acquisition module, 54 skin range correction module, 55 human determination module, 56 result output module, 70, 71, 72 face area, 75 reference area, 76 upper area, 77 lower area

The invention claimed is:

1. An information processing device, comprising:
at least one processor; and
at least one memory device that stores a plurality of instructions which, when executed by the at least one processor, causes the at least one processor to:
extract a human area in which it is determined that a human is present from an image taken by an imaging device;
acquire a representative value of first feature values, the first feature values being calculated by inputting, to a conversion function, each color of pixel included in a part of the human area;
correct, based on the representative value, a skin range indicating that a color indicated by a feature value acquired with the conversion function is a color of human skin; and
determine whether a human is present in a part of the image acquired by the imaging device, based on whether a second feature value calculated with the conversion function for each of a plurality of pixels forming the part of the image is within the corrected skin range;
wherein the plurality of instructions cause the at least one processor to correct the skin range so that an amount of correction becomes less as a quantity of pixels in the part of the image, each having the first feature value outside the skin range, becomes smaller.

2. The information processing device according to claim 1,
wherein the human area is a face area, and
wherein the part of the human area includes vicinity of a pair of eyes and excludes a vicinity of a mouth and an upper part of a forehead.

3. The information processing device according to claim 1, wherein the representative value is an average value of the feature values.

4. The information processing device according to claim 1, wherein, when a red component, a green component, and a blue component of a pixel are given as R, G, and B, respectively, and Cr, Cg, and Cb are coefficients determined in advance, an output "e" of the conversion function is calculated by the following expression:

$$e = Cr \times R + Cg \times G + Cb \times B - \max(G, B).$$

5. The information processing device according to claim 4, wherein, when an average value of the feature values used to calculate the skin range before the correction is given as $\mu r$, an average value of the first feature values is given as $\mu 1$, a quantity of pixels each having the first feature value that is outside the skin range is given as $An$, a quantity of pixels forming the part of the human area is given as $Ap$, and "n" is an integer of 1 or more and 3 or less, an upper limit value and a lower limit value of the skin range are corrected based on $\Delta \mu$ calculated with the following expression:

$$\Delta \mu = (\mu 1 - \mu r) \times (An/Ap)n.$$

6. The information processing device according to claim 4, wherein, when an average value of the feature values used to calculate the skin range before the correction is given as $\mu r$, an average value of the first feature values is given as $\mu 1$, a quantity of pixels each having the first feature value that is outside the skin range is given as $An$, a quantity of pixels forming the part of the human area is given as $Ap$, a quantity of pixels of an eye area included in the part is given as $Ae$, and "n" is an integer of 1 or more and 3 or less, an upper limit value and a lower limit value of the skin range are corrected based on $\Delta \mu$ calculated with the following expression:

$$\Delta \mu = (\mu 1 - \mu r) \times (An/(Ap - Ae))n.$$

7. The information processing device according to claim 1,
wherein the plurality of instructions cause the at least one processor to:
extract a plurality of face areas as a plurality of human areas,
acquire a representative value of first feature values of pixels included in a part of a largest face area out of the plurality of face areas, the first feature values being calculated with the conversion function by inputting, to the conversion function, each color of the pixels included in the part of the largest face area, and
determine whether one of the plurality of face areas that is not used to acquire the representative value includes a human face, based on whether a second feature value calculated with the conversion function for each of pixels included in the one of the plurality of face areas is within the corrected skin range.

8. An information processing method, comprising:
extracting, with at least one processor operating with a memory device in a computer, a human area in which it is determined that a human is present, from an image taken by an imaging device;
acquiring, with the at least one processor operating with the memory device in the computer, a representative value of first feature values, the first feature values being calculated by inputting, to a conversion function, each color of pixel included in a part of the human area;
correcting, based on the representative value, a skin range indicating that a color indicated by a feature value acquired with the conversion function is a color of human skin, with the at least one processor operating with the memory device in the computer; and
determining, with the at least one processor operating with the memory device in the computer, whether a human is present in a part of the image acquired by the imaging device, based on whether a second feature value calculated with the conversion function for each of a plurality of pixels forming the part of the image is within the corrected skin range; and correcting the skin range so that an amount of correction becomes less as a quantity of pixels in the part of the image, each having the first feature value outside the skin range, becomes smaller.

9. A non-transitory computer readable storage medium storing a plurality of instructions, wherein when executed by at least one processor, the plurality of instructions cause the at least one processor to:

extract a human area in which it is determined that a face is present, from an image taken by an imaging device;

acquire a representative value of first feature values, the first feature values being calculated by inputting, to a conversion function, each color of pixel included in a part of the human area;

correct, based on the representative value, a skin range indicating that a color indicated by a feature value acquired with the conversion function is a human skin color; and determine whether a human is present in a part of the image acquired by the imaging device, based on whether a second feature value calculated with the conversion function for each of a plurality of pixels forming the part of the image is within the corrected skin range; and correct the skin range so that an amount of correction becomes less as a quantity of pixels in the part of the image, each having the first feature value outside the skin range, becomes smaller.

* * * * *